Patented May 21, 1940

2,201,235

UNITED STATES PATENT OFFICE 2,201,235

CATALYST AND PROCESS OF PRODUCING SAME AND PROCESS OF EMPLOYING SAID CATALYST IN HYDROGENATION REACTIONS

Charles William Lenth and Robert Newell Du Puis, Chicago, Ill., assignors to Association of American Soap and Glycerine Producers, Incorporated, New York, N. Y., a corporation of Delaware No Drawing. Application August 17, 1936, Serial No. 96,476

17 Claims. (Cl. 260—635)

This invention relates to catalysts, and it has special reference to catalysts for the hydrogenolysis of carbohydrates.

One object of this invention is to provide a cheap, rugged, long-lived catalyst for general use.

Another object of this invention is to provide an extremely active catalyst for the hydrogenolysis of carbohydrate materials.

A further object of this invention is to provide a method for the production of a highly active catalyst of the character described from cheap raw materials by means of a simple and inexpensive process.

A further object of this invention is to provide a copper-aluminum hydrogenation catalyst which exhibits its maximum catalytic activity on sucrose without the necessity of any reducing treatment prior to its use in the hydrogenation reaction.

We are aware that catalysts comprising copper and aluminum have been suggested heretofore, but all of these catalysts have been prepared by methods which are incapable of producing maximum hydrogenating activity, since in all cases they have either (1) been made at temperatures below dull red heat, or (2) been so prepared as to be acid soluble, or (3) required reduction with hydrogen prior to use in any hydrogenation reaction. We have found that copper-aluminum catalysts thus characterized are of low hydrogenating power and have a relatively short life, and our experiments have indicated that they have little or no commercial value.

On the contrary, our new catalyst can be prepared only at temperatures above dull red heat; it is insoluble in strong acid; and it is active towards some substrates without any reducing treatment prior to its use in the hydrogenation reaction.

A catalyst embodying our invention has many advantages over those known and used in this art heretofore. An obvious advantage is that it can be prepared (according to one method) from two cheap chemicals of ordinary commercial grade—copper sulfate and aluminum sulfate—by a simple process involving precipitation with sodium carbonate, washing, drying, grinding, and heating, it being highly desirable, however, that the heating be carried out under carefully controlled conditions. The product itself, aside from its cheapness, is characterized by high activity, ruggedness, long life, and ease of reactivation in cases where reactivation finally becomes necessary. Its insolubility in acids is such that boiling with nitric acid may be used as a step in its purification. This insolubility in acids makes it especially valuable in those hydrogenation reactions, such as carbohydrate hydrogenolyses, where acid by-products are sometimes formed in which ordinary catalysts are more or less readily soluble. It exhibits, in addition, the ability to catalyze hydrogenation reactions at relatively low pressures, thus making possible important economies in the cost of hydrogenating equipment.

Our new catalyst may be prepared in many different ways without materially affecting its activity. Concentrated solutions of the nitrates or sulfates or organic acid salts of copper and aluminum may be evaporated to dryness and then ignited at temperatures above 750° C. until the acidic products have been driven off and the cocoa-brown product remains. Intimate mixtures of the carbonates, oxides, or hydroxides may be ignited, preferably at temperatures of 750–1100° C., for a sufficient time to effect the reaction, but reasonably satisfactory results can be obtained at higher temperatures. In general, in fact, the reaction may take place when any copper or aluminum compounds capable of producing oxides at high temperatures are mixed together and treated under the above temperature conditions.

We prefer the following method of preparation because it is subject to better control and results in a more consistent grade of product than some of the other methods, but it is to be understood that we do not limit ourselves to this or any other method of preparing this catalyst except as defined by the appended claims and as set forth in this specification.

Example I

Technical grade copper sulfate (6.25 parts) and technical grade aluminum sulfate (16 parts) (we prefer an equimolecular ratio or a slight excess of aluminum, although we have found that a wide range of proportions forms useful catalysts) are dissolved in two and one-half times their weight of water and added slowly with stirring to an equal volume of a solution containing an excess of sodium carbonate (13–14 parts). The slurry may be heated or allowed to stand at room temperature until most of the free carbon dioxide is expelled. The solid is then removed by filtration and dried at 100–125° C. The dry solid (11.5 parts) is then ground with or without water, brought on a filter, and thoroughly washed until all the sodium salts are removed. Since chlorides poison this catalyst, and since sodium salts are injurious in the ignition, water substantially free from sodium and chlorine should be used in the washing. We have found it satisfactory to dry the slurry before it is washed, although the washing may be done immediately after precipitation if desired. The light blue product (6.0 parts) is then dried and ignited at 750–1100° C. for a time sufficient to bring the entire mass to the furnace temperature. We prefer heating under conditions promoting uniformity of effect on all parts of the mass, as in a continuous kiln. Too short an ignition period results in incomplete conversion to the desired product, but the material may be heated for as long as five hours at 1000° C. without adversely affecting its activity. The yield of finished product is 4.5 parts, representing a 96 per cent recovery of copper and aluminum.

We have found that the heating operation should be continued until fumes cease to be evolved—that is, until there is no further loss in weight—and until the catalyst has become substantially insoluble in boiling 5 per cent nitric acid. It is of value to observe the color changes carefully, as the heating should not be terminated until there is no further change in color.

The color of the catalyst prepared as described above is a rich brown resembling cocoa. This we consider to be a pro-catalyst form of our product. This appears to contain copper aluminate. However, at the completion of a hydrogenation this catalyst has a color which may vary from a deep violet to a brick red. This is an active form of the catalyst. It may be transformed into the cocoa-colored modification by heating to 750°–1100° C. as in its original preparation. Both forms of the catalyst are stable in air. They have been stored for long periods with free access of air without impairing their efficiency. The brown form has been heated in oxygen for long periods at high temperatures without materially affecting its activity.

In the hydrogenation of some substances, such as sucrose, the two forms of the catalyst may be used interchangeably. In other cases, as in the hydrogenation of dextrose, the reaction is accomplished with the aid of the "active" or reduced form. The catalyst may be activated by use, as in the hydrogenation of sucrose, or by treatment at about 200° C. or slightly higher in the presence of hydrogen.

We do not wish to be bound to any specific ratio of copper to aluminum, since copper and aluminum in an extremely wide range of ratios have been found by us to work successfully. We have found that the activity of our catalyst increases as we increase the percentage of aluminum used in preparing it, and reaches a maximum between one atom copper to one atom aluminum and one atom copper to three atoms aluminum, but excellent catalysts can be produced from mixtures having a much wider range of copper and aluminum content. It, therefore, follows that related oxide combinations of copper and aluminum other than copper aluminate, narrowly defined, at times contaminate or predominate in the substances identified in this specification by the methods of preparation herein set forth. Because of the lack of a word exactly descriptive of the full range of the product of this invention, the term copper aluminate is used herein as meaning those substances derived from the application of the disclosure of this specification, whether or not characterized by the exact stoichiometric proportions of copper aluminate narrowly defined.

The preparation of our catalyst by direct ignition of inorganic salts may be carried out as follows:

*Example II*

Cupric nitrate trihydrate (24.2 parts) and aluminum sulfate (66.7 parts) are dissolved in the minimum quantity (about 50 parts) of hot water. The water is removed by carefully controlled heating. The dried material is then heated at 750–1100° C. for a time sufficient for the reaction between the oxides to come to completion. The yield is 95.6 per cent based on copper and aluminum.

In the hydrogenolysis of carbohydrates we prefer to use a promoter comprising an alkaline substance, such as the carbonates of the alkali group metals, which we add after ignition of the catalyst. The amount of promoter used may be varied within wide limits (from 0.1 per cent to 10 per cent of the catalyst); however, for most purposes we have found a promoter concentration of 5 per cent to be satisfactory. Sodium and potassium carbonates are especially suitable for this purpose. The primary purpose of the study which resulted in the present invention was to prepare a catalyst for the hydrogenolysis of carbohydrates. Our catalyst has shown itself to be extremely well suited to that type of reaction, but its utility as a catalyst is not limited to such reactions. Our catalyst is useful for other types of hydrogenations, as well as for certain oxidation reactions, and for other catalytic purposes.

The following examples illustrate the utility of this catalyst:

*Example A.*—Sucrose (10 parts), copper-aluminum catalyst, prepared in accordance with Example I (0.75 part), sodium carbonate (0.0375 part), and methanol (10 parts) were treated with hydrogen at 1620–1740 pounds per square inch at 250° C. until about 6.25 moles of hydrogen were absorbed by each mole of sucrose. The partial pressure of hydrogen during the reaction was, of course, much less than the gauge pressure due to the high vapor pressure of methanol at this temperature. The yields were: propylene glycol 45.8 per cent; glycerol 21.5 per cent; liquid residue non-volatile at the boiling point of glycerol 6.8 per cent.

*Example B.*—Sucrose (10 parts), a copper-aluminum catalyst prepared as in Example I (1.25 parts), sodium carbonate (0.0625 part), and methanol (5 parts) were treated with hydrogen at 1000–1200 pounds per square inch at 235° C. The reaction was continued until about six moles of hydrogen had been absorbed by each mole of sucrose. The yields were: propylene glycol 43.8 per cent; glycerol 28.8 per cent; liquid residue 8.8 per cent. When the catalyst in this experiment had been used five times, it still retained its original activity.

*Example C.*—Anhydrous dextrose (90 parts), methanol (90 parts), reduced copper-aluminum catalyst (9 parts), and sodium carbonate (0.45 part) were treated with hydrogen at 1440–1560 pounds per square inch and at a maximum temperature of 240° C. Each mole of dextrose absorbed about 2.9 moles of hydrogen, and the products were: propylene glycol 40.0 per cent; glycerol 22.1 per cent; liquid residue non-volatile at the boiling point of glycerol 6.9 per cent.

*Example D.*—A continuous stream of air and methanol was passed over a reduced copper-aluminum catalyst prepared as in Example I and heated to 350° C. The methanol was oxidized in good yield to formaldehyde. The exothermicity of the reaction served to maintain the catalyst at approximately the above temperature without the external application of heat.

*Example E.*—Soya bean oil (100 parts) and a reduced copper-aluminum caltalyst prepared as in Example I (0.5 part) were treated with hydrogen at 12–25 pounds per square inch and up to 250° C. for 2.75 hours. The product was still liquid when cooled, and the iodine number was found to have changed from 137.5 to 124.4.

*Example F.*—A reduced copper-aluminum catalyst prepared as in Example I (10 parts) was heated at about 250° C. while 62.5 parts glycerol were dropped slowly onto it. A light yellow product distilled and was collected. Fractionation of this material gave 19.3 parts boiling at 140–160° C., from which 8.6 parts substantially pure acetol boiling at 144–147° C. were obtained.

It is obvious that a catalyst such as we have described will be of great use in the arts where an active cheap catalyst is required.

Further modifications will be apparent to those skilled in the art, and it is desired, therefore, that the invention be limited only by the prior art and the scope of the appended claims.

Having thus described our invention, what we claim and desire to secure by Letters Patent is:

1. A process of hydrogenation which comprises subjecting a reaction mixture comprising hydrogen and hydrogenizable material to superatmospheric conditions of temperature and pressure while maintaining such reaction mixture in contact with a catalyst resulting from heat treating a mixture of oxide-forming copper and aluminum compounds at temperatures of 750 to 1100 degrees C. until a substantially acid-insoluble product is formed, and adding a promoter selected from the group of alkali carbonates.

2. A process of hydrogenation which comprises subjecting a reaction mixture comprising hydrogen and hydrogenizable material to superatmospheric conditions of temperature and pressure while maintaining such reaction mixture in contact with a catalyst resulting from heat treating an intimate mixture of oxide-forming copper and aluminum compounds at temperatures of 750 to 1100 degrees C. until a substantially acid-insoluble product is formed, and activating such product with hydrogen at temperatures of substantially 200°–350° C.

3. A process for the hydrogenation of carbohydrates selected from the group of mono- and di-saccharides which comprises subjecting a mixture comprising hydrogen and carbohydrate in a liquid vehicle to temperatures of approximately 100 degrees C. and upwards, and pressures of approximately 10 atmospheres and upwards while maintaining such mixture in contact with a catalyst resulting from heat treating a mixture of oxide-forming copper and aluminum compounds at temperatures of 750 to 1100 degrees C. until a substantially acid-insoluble product is formed, and adding an alkaline promoter selected from the group of alkali carbonates.

4. A process for the hydrogenation of carbohydrates selected from the group of mono- and di-saccharides which comprises subjecting a mixture comprising hydrogen and carbohydrate in a liquid vehicle to temperatures of approximately 100 degrees C. and upwards, and pressures of approximately 10 atmospheres and upwards while maintaining such mixture in contact with a catalyst resulting from heat treating a mixture of oxide-forming copper and aluminum compounds at temperatures of 750 to 1100 degrees C. until a substantially acid-insoluble product is formed, activating such product with hydrogen at temperatures of substantially 200°–350° C., and adding an alkaline promoter selected from the group of alkali carbonates.

5. A process for the hydrogenation of sucrose which comprises subjecting a mixture comprising hydrogen and sucrose in a suitable liquid vehicle to temperatures of approximately 100 degrees C. and upwards and pressures of approximately 10 atmospheres and upwards while maintaining such mixture in contact with a catalyst resulting from heat treating to 750 to 1100 degrees C. a mixture of oxide-forming copper and aluminum compounds until a substantially acid-insoluble product is formed and adding an alkaline promoter selected from the group of alkali carbonates.

6. A process for the hydrogenation of dextrose which comprises subjecting a mixture comprising hydrogen and dextrose in a suitable liquid vehicle to temperatures of approximately 100 degrees C. and upwards and pressures of approximately 10 atmospheres and upwards while maintaining such mixture in contact with a catalyst resulting from heat treating to 750 to 1100 degrees C. a mixture of oxide-forming copper and aluminum compounds until a substantially acid-insoluble product is formed, activating such product with hydrogen at temperatures of substantially 200°–350° C., and adding an alkaline promoter selected from the group of alkali carbonates.

7. As a new composition of matter, a chemically stable chemical substance consisting of partially reduced copper aluminate.

8. A catalyst comprising copper aluminate activated with hydrogen at temperatures of substantially 200 degrees C. to 350 degrees C.

9. A hydrogenation catalyst comprising copper aluminate activated by contact at reaction temperatures with a reacting mixture of hydrogen and hydrogenizable organic matter.

10. A composition of matter for use as a catalyst comprising in intimate admixture copper aluminate and an alkali metal carbonate promoter.

11. A process of preparing a catalyst which comprises heating intimate mixtures of oxide-producing compounds of copper and aluminum at a temperature above 750° C. until a substantially acid-insoluble cocoa-colored product results, and activating such product by treatment with hydrogen at temperatures of substantially 200°–350° C.

12. A process of preparing a catalyst which comprises precipitating basic copper and aluminum compounds from solution by the addition of sodium carbonate, removing water-soluble salts, grinding, and then heating the resultant material at a temperature above 750° C. for a time sufficient to produce a substantially acid-insoluble cocoa-colored product, and activating such product by treatment with hydrogen at temperatures of substantially 200°–350° C.

13. A catalyst comprising copper aluminate and an alkali carbonate.

14. A process of preparing a catalyst which comprises precipitating basic copper and aluminum compounds from solution by the addition of sodium carbonate, removing water soluble salts, grinding, and then heating the resultant material at a temperature above 750° C. for a time sufficient to produce a substantially acid-insoluble cocoa-colored product, activating such product by treatment with hydrogen at temperatures of substantially 200°–350° C., and adding an alkaline promoter selected from the group of alkali carbonates.

15. A process of preparing a catalyst which comprises heating oxide-producing compounds of copper and aluminum at a temperature above 750° C. until a substantially acid-insoluble cocoa-colored product results, activating such product by treatment with hydrogen at temperatures of substantially 200°–350° C., and adding an alkaline promoter selected from the group of alkali carbonates.

16. A process of preparing a catalyst which comprises heating oxide-producing compounds of copper and aluminum at a temperature above 750° C. until a substantially acid-insoluble cocoa-colored product results, activating such product by treatment with hydrogen at temperatures of substantially 200°–350° C., and adding from 0.1 to 10 per cent of an alkaline promoter of the class consisting of the carbonates of the alkali group metals.

17. A process of preparing a catalyst which comprises precipitating basic copper and aluminum compounds from solution by the addition of a basic precipitating agent, removing water-soluble salts, and then heating the resultant material at a temperature above 750 degrees C. for a time sufficient to produce substantially acid-insoluble cocoa-colored product, and activating such product by treatment with hydrogen at temperatures of substantially 200 to 300 degrees C.

CHARLES WILLIAM LENTH.
ROBERT NEWELL DU PUIS.